UNITED STATES PATENT OFFICE.

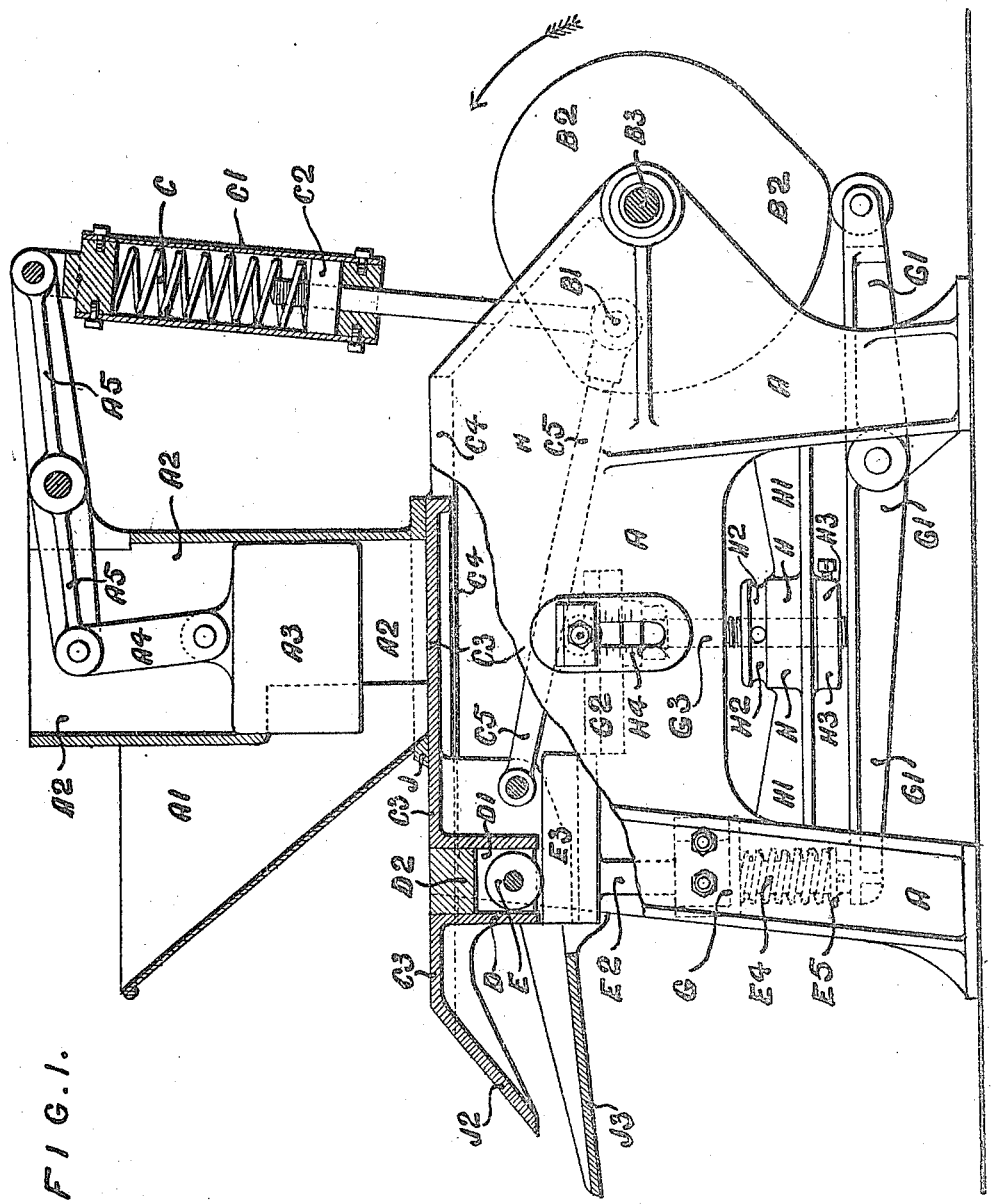

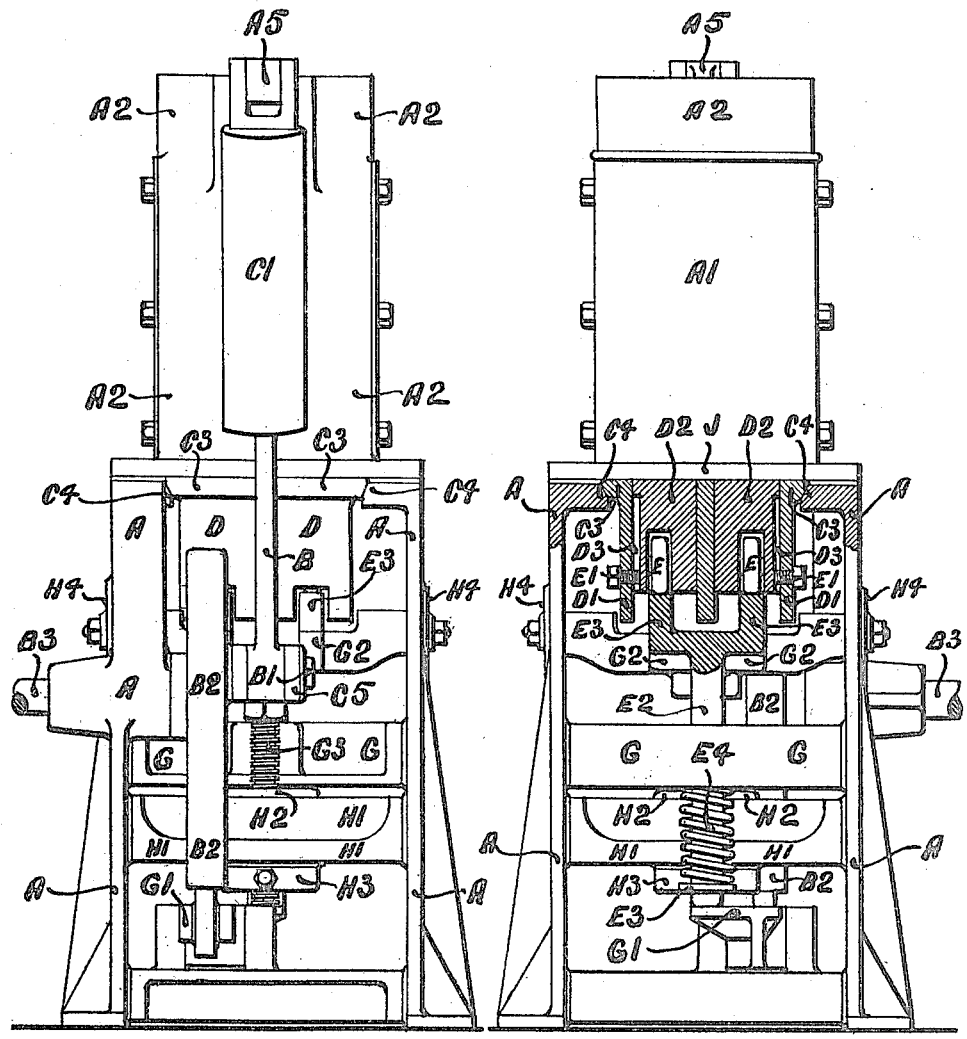

DAVID McERLANE, OF SPRINGBURN, GLASGOW, SCOTLAND.

MACHINE FOR DIVIDING AND MEASURING DOUGH.

1,231,396.  Specification of Letters Patent.  Patented June 26, 1917.

Application filed August 1, 1916. Serial No. 112,566.

*To all whom it may concern:*

Be it known that I, DAVID McERLANE, a subject of the King of Great Britain and Ireland, and a resident of Springburn, Glasgow, Scotland, have invented certain new and useful Improvements in and Connected with Machines for Dividing and Measuring Dough, of which the following is the specification.

This invention relates to machines for dividing and measuring dough, and of the type in which the dough is fed into measuring cavities containing ejecting plungers, the cavities being arranged in a horizontally reciprocating table; and has for its object to provide an improved and simplified construction of such machines which will give the accurately correct and equal weights of dough necessary, whether the machine is to be used for the measuring of the dough required for the making of bread or for the making of biscuits, rolls, or the like.

A machine made according to the invention comprises essentially a hopper to receive the dough and communicating with the lower end of a cylinder in which works a plunger or piston operatively connected with a crank pin on a disk on a first motion shaft, so that the plunger is made to reciprocate in its cylinder on the rotation of the disk. A pressure-regulating device may be arranged in the connection between the piston and the crank pin if desired, and means may also be provided whereby the weight of the piston itself may be adjustable. Immediately under the lower open end of the cylinder is the reciprocating table or platform having the measuring cavities in which are the ejecting plungers, this table being also connected with the crank pin so that it is made to reciprocate in the framing on the rotation of that crank pin. Each plunger is free to descend when the cavity is being brought beneath the cylinder, so that such cavity may receive dough pressed into it by the piston in the cylinder. Means acting to raise the plunger on the outward travel of the table are provided comprising a race for a roller on the plunger, this race being in two parts, one adjustably fixed, as hereinafter described, and the other moving under the influence of a cam or the like. Thus the plunger is made to travel up and down in the cavity to receive a piece of dough of the correct weight and then raise that piece of dough to the level of the surface of the table after the cavity has traveled from beneath the cylinder. The lower edge of the hopper acts as a scraper to sever the piece of dough pressed into the cavity from the remainder of the dough in the hopper and cylinder on the outward travel of the table, a second scraper removing that piece of dough on the backward travel of the table after it has been raised out of the cavity by the rising of the plunger therein.

To determine the distance the plunger will descend in the cavity, when the table has reached its inmost travel to bring that cavity beneath the cylinder and consequently the amount of dough which the cavity receives at each operation, there is provided a screwed spindle which carries at its upper end a block forming a continuation of the part of the race for the plunger roller which is on the upper end of the rod operating the plunger. The position of this block is determined by raising or lowering the screwed spindle by means of a nut bearing on a bracket or shelf in the framing through which bracket the screwed spindle extends. The block or screwed spindle carries a pointer working over a scale on the outer side of the frame. This scale indicates the amount by weight of dough which the cavity can receive when the position of the block is set to permit the plunger in the cavity to descend to the extent necessary to enable the cavity to receive that amount of dough. A fixed table or platform is provided to receive the pieces of dough as they are discharged from the reciprocating table on each backward travel thereof.

An example of the improved machine is shown on two accompanying sheets of explanatory drawings, Figure 1, Sheet 1, being a longitudinal view, partly in section, and Figs. 2 and 3, Sheet 2, end views thereof, the latter being also partly in section.

As shown in these drawings, above the framing A of the machine there is a hopper $A^1$ to receive the dough. This hopper is secured to one side of and communicates at its lower end with an opening through the wall of a cylinder $A^2$ carried by the framing. In this cylinder there is a plunger or piston $A^3$ connected by a link $A^4$ with one end of a lever $A^5$ pivoted on the cylinder. The opposite end of this lever is connected by a rod B with a crank pin $B^1$ on a cam disk $B^2$ secured on the first motion shaft $B^3$, so that the piston $A^3$ is made to reciprocate in the cylinder $A^2$ on the rotation of the disk. As shown, the rod B is connected to the lever $A^5$ through a pressure-determining device comprising a spring C working in a cylinder $C^1$ connected at its upper end to the lever $A^5$ and carrying within its lower end a block $C^2$ screwed on to the upper end of the rod B. The position of the block $C^2$ on the rod B determines the compression of the spring C and consequently the pressure with which the plunger $A^3$ will press on the surface of the dough beneath it before that spring will yield. Immediately beneath the cylinder and hopper, a table $C^3$ is carried in guides $C^4$ in the framing of the machine, this table being also connected by a rod $C^5$ with the crank pin $B^1$, so that it travels backward and forward in its guides on the rotation of the disk $B^2$. Near its forward end the table $C^3$ has on its under side a depending part D through which two cavities or pockets $D^1$ are formed. In each cavity is a plunger or piston $D^2$ fitted with a roller E and prevented from rotating in the cavity by pins $E^1$ screwed through the side of the depending part D, and projecting into slots $D^3$ in the plungers. The plungers $D^2$ descend when the table $C^3$ is being brought beneath the cylinder $A^2$ so that the cavities $D^1$ are free to receive dough pressed into them by the descent of the piston $A^3$ in its cylinder; and the plungers are raised on the outward travel of the table $C^3$ by a rod $E^2$ the upper end of which carries a block $E^3$ which serves as a race on which the rollers E of the plungers $D^2$ travel during part of the travel of the table. The rod $E^2$ has on it a spring $E^4$ acting between a collar $E^5$ on the rod and a bracket G through which the rod passes. The spring thus tends always to keep the rod in its lowest position. The rod is raised to its highest position, against the action of this spring, by a rocking lever $G^1$ pivoted in the framing, one end of this lever bearing on the lower end of the rod $E^2$ and the other end carrying a roller and projecting into the path of the cam disk $B^2$. This cam is so shaped and positioned on the first motion shaft that the lever $G^1$ is made to raise the rod $E^2$ after the plunger roller E is on the block $E^3$ during the outward travel of the table $C^3$, the plungers reaching their topmost level when the table has reached its extreme outward position. Instead of the cam for operating the rocking lever $G^1$ being in one with the disk $B^2$, a separate cam may be secured on the shaft $B^3$.

A second block $G^2$ is provided the upper surface of which forms a continuation of the race formed on the first block $E^3$ for the plunger rollers E. This block $G^2$ is carried on the upper end of a screwed spindle $G^3$ passing through an aperture in a boss H on a bracket $H^1$ and having on it a nut $H^2$ resting on the upper surface of the boss. By turning this nut the screwed spindle and block which it carries is raised or lowered, a lock nut $H^3$ adjustable on the lower end of the spindle $G^3$ and bearing on the boss H secures the spindle and block in any desired position. The position of the block $G^2$ determines the distance the plungers $D^2$ will descend in their cavities when the table has reached its inmost travel to bring these cavities beneath the cylinder, and consequently the amount of dough which the cavities receive at each operation. A scale $H^4$ indicates the weight of dough which the cavity can receive when the block $G^2$ is set to any desired height, a mark or pointer on the spindle indicating this position on the scale. The lower edge of the piston $A^3$ on the side next the hopper $A^1$ may be sharpened to facilitate the severance of the portion of the dough pressing into the cavity from the remainder of the dough in the hopper, and the portion of the dough pressed into the cavity is severed from the remainder of the dough in the hopper and cylinder, on the outward travel of the table, by the lower edge of the hopper acting as a scraper working over the surface of the table $C^3$. Further the pieces of dough after they have been raised out of the cavities to the level of the table by the raising of the plungers therein, as hereinbefore described, are removed by a second scraper J acting on these pieces of dough on the backward travel of the table, the cam disk $B^2$ being so contoured that the plungers are held up during this backward travel until the pieces of dough are removed. These pieces of dough then slide down an inclined part $J^2$ on the end of the table $C^3$ and fall on to a lower table $J^3$ secured to the framing, from which they may be removed either by hand or a traveling apron passing over this table. The upper end of the cylinder may be closed by a hinged cover if desired.

What I claim is:—

1. In a machine for dividing and measuring dough, a horizontally reciprocating table having a measuring cavity in its upper face, a vertically reciprocating ejecting plunger working in said cavity, a hopper arranged above the reciprocating table, a vertically arranged cylinder with the lower portion of which the hopper communicates, a reciprocating piston in the cylinder, a roller at the lower end of the plunger, a race for the roller in two parts, one fixed but adjustable as to height to determine the depth of the measuring cavity in the table and the other moving vertically to actuate the plunger, and means to sever the piece of dough pressed into the cavity and to finally remove that piece of dough, substantially as described.

2. In a machine for dividing and measuring dough, a horizontally reciprocating table having a measuring cavity in its upper face, a vertically reciprocating ejecting plunger working in said cavity, a hopper arranged above the reciprocating table, a vertically arranged cylinder with the lower portion of which the hopper communicates, a reciprocating piston in the cylinder, a roller at the lower end of the plunger, a first motion shaft, a crank pin disk on the shaft, link and lever connections between the piston and the crank pin, a pressure-determining device in connection with the crank pin, and a connecting rod between the crank pin and the table.

3. In a machine for dividing and measuring dough, a horizontally reciprocating table having a measuring cavity in its upper face, a vertically reciprocating ejecting plunger working in said cavity, a hopper arranged above the reciprocating table, a vertically arranged cylinder with the lower portion of which the hopper communicates, a reciprocating piston in the cylinder, a roller at the lower end of the plunger, a first motion shaft, a crank pin disk on the shaft, link and lever connections between the piston and the crank pin, a cylinder carried by the lever operating the piston, a spring and a block adjustable in the cylinder, as described.

4. In a machine for dividing and measuring dough, a horizontally reciprocating table having a measuring cavity in its upper face, a vertically reciprocating ejecting plunger working in said cavity, a hopper arranged above the reciprocating table, a vertically arranged cylinder with the lower portion of which the hopper communicates, a reciprocating piston in the cylinder, a roller at the lower end of the plunger, a block in two parts forming a race for the roller, a rod carrying one part of the block, a spring on the rod, a collar on the rod and a fixed bracket between which the spring acts, a rocking lever acting on the rod, a cam on a first-motion shaft actuating the rocking lever, a screwed spindle carrying the second part of the block, and means for raising and lowering the screwed spindle, as described.

In testimony whereof I have signed my name to this specification, in the presence of two subscribing witnesses.

DAVID McERLANE.

Witnesses:
  WILFRED HUNT,
  JAMES EAGLESOM.

Copies of this patent may be obtained for five cents each, by addressing the "Commissioner of Patents, Washington, D. C."